United States Patent [19]

Hedgepeth

[11] Patent Number: 4,819,736

[45] Date of Patent: Apr. 11, 1989

[54] WEED REMOVAL TOOL

[76] Inventor: Virgil E. Hedgepeth, 704 Hillcrest Dr., Bradenton, Fla. 33529

[21] Appl. No.: 29,861

[22] Filed: Mar. 24, 1987

[51] Int. Cl.⁴ .............................................. A01B 33/00
[52] U.S. Cl. .................................... 172/25; 172/371; D15/139
[58] Field of Search ...................... 171/105; 56/400.21; D15/139; 299/79; 294/50, 50.7, 51; 172/371, 25, 111, 21

[56] References Cited

U.S. PATENT DOCUMENTS

| | | | |
|---|---|---|---|
| D. 240,263 | 6/1976 | Southall | D15/139 |
| D. 278,065 | 3/1985 | Sydlowski et al. | D15/139 |
| 976,811 | 11/1910 | Kloss | 171/105 |
| 3,129,771 | 4/1964 | Lidstone | 172/25 |
| 3,938,249 | 2/1976 | Chacon | 172/25 X |
| 3,997,279 | 12/1976 | Porter | D15/139 X |
| 4,213,504 | 7/1980 | Schneider | 172/25 |
| 4,294,183 | 10/1981 | Morgan | 299/79 X |
| 4,319,642 | 3/1982 | Merz | 172/371 X |

FOREIGN PATENT DOCUMENTS

| | | | |
|---|---|---|---|
| 271752 | 6/1913 | Fed. Rep. of Germany | 172/25 |
| 160978 | 6/1933 | Switzerland | 172/25 |
| 609883 | 6/1978 | U.S.S.R. | 299/79 |
| 862973 | 3/1961 | United Kingdom | 172/25 UX |

Primary Examiner—Richard J. Johnson
Assistant Examiner—Sam Rimell
Attorney, Agent, or Firm—Cushman, Darby & Cushman

[57] ABSTRACT

A tool for removing roots and plants from the earth while only minimally disturbing the surrounding area. The tool includes a first, proximal end for attachment to a device for rotating the tool and a second end including a three-tined head. One tine or prong of the three-tined head is longer than the remaining tines and serves to anchor and stabilize the tool in a working position while preventing a vibration or wandering of the tool during rotation. Adjacent prongs or blades rotate about the elongated prong as the body of the tool is rotated and thus disrupt the soil and root system of the undesired plant enabling the plant to be easily removed from the ground.

8 Claims, 1 Drawing Sheet

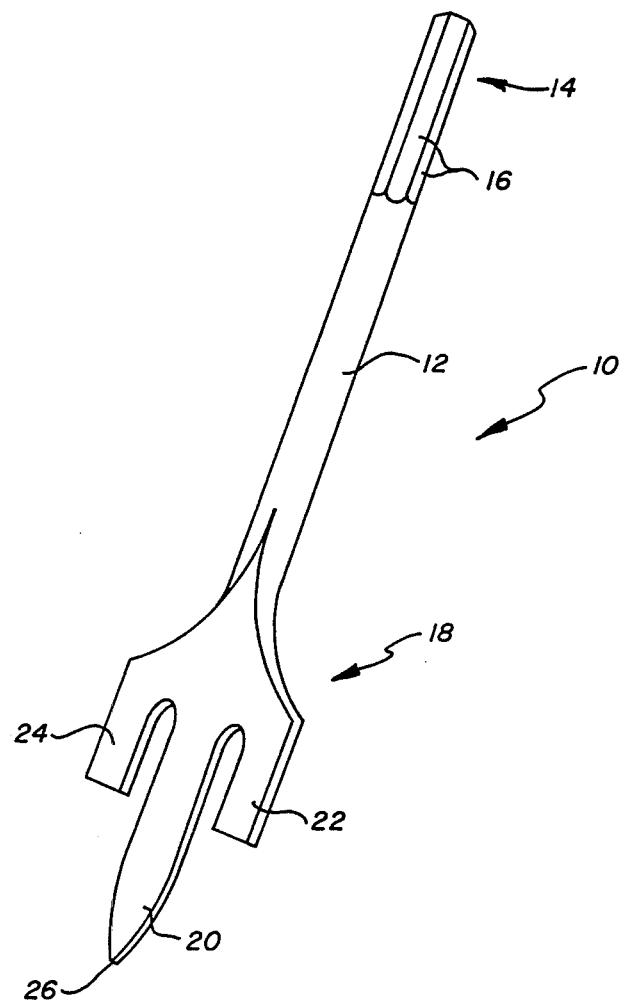

WEED REMOVAL TOOL

BACKGROUND OF THE INVENTION

1. Field of the Invention

The present invention relates to a gardening tool and, more particularly, to a tool for removing unwanted plants from the ground.

2. Description of the art

The removal of weeds and unwanted plants from gardens and yards has been a long standing problem for both casual and avid gardeners. Typically, such unwanted weeds are removed, for example, with a two-pronged tool which is inserted into the ground adjacent to the base of the plant and pivoted to pluck the weed from the ground. Such tools are disadvantageous, however, because removal of large or deep-rooted plants is quite difficult, requiring a great deal of strength. Thus, such a tool makes weed removal by those who lack sufficient strength or manual dexterity, such as the elderly, very difficult. Further, such tools concentrate the force of removal at the top of the root system. Indeed, the plant will often break off at this point and the roots which remain in the ground can readily resprout. Thus, this known tool often fails to remove the weed effectively.

The ineffectiveness of such pivoting two prong hand tools has led to widespread use of herbicides to kill unwanted pants and weeds. However, the use of herbicides is difficult since weeds are often disposed immediately adjacent plants that are desired. Therefore, the gardener must be careful both to chose a herbicide that will not harm desired plants yet which will effectively remove the undesired plants. Further, such herbicides introduce poisons into the environment which can leak through the soil into the water system are thus contribute to water pollution.

It would therefore be desirable to provide a means for removing weeds which is both specifically directed the particular unwanted plant and effectively removes the entire plant without the requirement for manual dexterity and body strength and without the danger to the environment typical of herbicides.

SUMMARY OF THE INVENTION

It is therefore an object of the present invention to provide a tool which will quickly and easily remove unwanted weeds and plants, which is easy to use even by the elderly and is nonhazardous to desired plants, individuals utilizing the same and the environment in general.

These and other objects are realized in accordance with the present invention which provides a tool having a first end including a structure enabling coupling of the tool to a device for rotating the same such as a power drill, a power screw driver or a standard socket wrench for rotation by hand. The other end of the tool has a tined head including a prong and first and second blade elements extending parallel thereto and spaced therefrom. The prong is longer than the two blades so as to firmly and stably engage the tool adjacent an unwanted plant while the blades engage and remove the root system of the plant from the soil.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

BRIEF DESCRIPTION OF THE DRAWINGS

FIG. 1 is a perspective view of a plant removing tool formed in accordance with the present invention.

DETAILED DESCRIPTION OF THE PRESENTLY PREFERRED EXEMPLARY EMBODIMENT

Referring to the drawing figure, the present invention provides a root removing tool 10 which includes an elongated main body member 12 in the form of a rod having a first end 14 including a structure for attaching the same to a handheld tool such as a power screw driver or a power drill or a socket wrench. Though any suitable coupling structure could be provided, in the illustrated embodiment, first end 12 includes a number of planar faces 16 which enable the same to be gripped by the bit of a power drill or screw driver. In the alternative, tool 10 may be rotated through the use of a typical socket wrench which engages the planar faces 16.

The opposite end or head 18 of tool 10 preferably includes three tines. A first prong 20 which is disposed parallel to the longitudinal axis of tool 10 is provided so as to extend beyond the remaining two tines 22 and 24. Prong 20 preferably has a pointed distal end 26 which enables the same to be easily and firmly planted in the ground at the site of an unwanted plant. As can be seen, tines or blade elements 22, 24 are spaced from and extend parallel to prong 20. "The blade elements and prong have a width measured across said blades which is greater than or equal to the gap between the prong and blade elements". In the illustrated embodiment, blades 22,24 have flat distal ends though these may be pointed. Further the blades may have dull or sharpened edges depending on the compactness of the soil and density of the plant's root system. The blades facilitate the removal of a plant and its roots as described more fully below.

In use, the first or proximal end 14 of tool 10 is mounted into a power drill or power screw driver (not shown) or is held in the user's hand and is plunged prong 20 first into the ground immediately adjacent a weed or undesired plant. Once tool 10 has been firmly planted in the ground, the power tool is turned on so as to rotate main body 12 and hence the root removing head 18 of the tool. In the alternative, if no power tool is available and the tool has been inserted into the ground by hand, a typical socket wrench (not shown) can be engaged with proximal end 14 and used to rotate the plant removing tool. As the tool rotates, elongated prong 20 maintains the stability and position of the tool as side blades 22 and 24 engage and disrupt the entire root system of the unwanted plant while loosening the soil in the vicinity of the same. In this manner, the weed or unwanted plant can be removed in its entirety because the soil surrounding the root system and the root system itself has been disrupted and loosened. However, plants beyond the immediate vicinity of the tool are left undisturbed and have their root systems substantially entirely intact. Thus desired plants are not harmed or disturbed by the removal of the adjacent weed. Once the soil and root system of the unwanted plant has been sufficiently disturbed, the tool is simply removed from the ground as is the unwanted plant and the user can proceed to the next undesired plant.

While it is contemplated that the tool is preferably formed from metal, it is to be understood that plastic, wood or any other sufficiently rigid material could be used therefor.

While the invention has been described in connection with what is presently considered to be the most practical and preferred embodiment, it is to be understood that the invention is not limited to the disclosed embodiment, but, on the contrary, it is intended to cover various modifications and equivalent arrangements included within the spirit and scope of the appended claims.

I claim:

1. A tool for removing plants comprising:
    an elongated main body member having a first, proximal end and a second, distal end;
    said proximal end including means for coupling said main body member to a means for rotating said main body member about a longitudinal axis thereof; and
    said distal end "being generally planar and" including means for engaging and disrupting a root system and soil surrounding the base of an unwanted plant including a prong element having a longitudinal axis parallel to the longitudinal axis of said main body member and having a pointed distal end and first and second blade elements each being generally coplanar and parallel to said prong element and spaced laterally at each side therefrom by a gap, said prong element having a length greater than a length of each of said blade elements, said first and second blade elements and said prong element each having a width "as measured across said blade elements which is" greater than or equal to the gap defined between a said blade element and said prong element.

2. A tool as in claim 1, wherein said main body member is an elongated metal rod.

3. A tool as in claim 2, wherein said means for coupling comprises a plurality of flat faces defined about the circumference of said proximal end for engagement with a clamping attachment device provided on a means for rotation.

4. A tool as in claim 1, wherein said blade elements have flat distal-most ends so as to be substantially perpendicular to a longitudinal axis of said respective blade element.

5. A tool as in claim 1, wherein said blade elements are mounted on either side of said prong element.

6. A tool as in claim 1, wherein said longitudinal axis of said prong element is coincident with said longitudinal axis of said main body member.

7. A tool as in claim 6, wherein said blade elements are mounted on each side of said prong element.

8. A tool as in claim 1 wherein said main body member, said prong element and said first and second blade elements are formed as an integral one piece structure.

* * * * *